United States Patent [19]

Burnham

[11] Patent Number: 5,005,032
[45] Date of Patent: Apr. 2, 1991

[54] OPTICAL FINDER FOR CAMERA WITH FLIP-UP FLASH UNIT

[75] Inventor: William L. Burnham, Leroy, N.Y.

[73] Assignee: Eastman Kodak Company, Rochester, N.Y.

[21] Appl. No.: 479,006

[22] Filed: Feb. 12, 1990

[51] Int. Cl.$^5$ .................. G03B 13/06; G03B 15/03
[52] U.S. Cl. .................. 354/149.11; 354/187; 354/219
[58] Field of Search .............. 354/126, 145.1, 149.1, 354/149.11, 219, 187; 33/266

[56] References Cited

U.S. PATENT DOCUMENTS

| | | | |
|---|---|---|---|
| 607,583 | 7/1898 | Bentz | 33/266 X |
| 1,261,643 | 4/1918 | Stout | 354/219 |
| 1,933,784 | 11/1933 | Wittel | 33/266 |
| 2,448,920 | 9/1948 | Silberstein | 33/266 |
| 2,479,291 | 8/1949 | Baer | 354/219 |
| 2,590,164 | 3/1952 | Fairbank | 354/219 X |
| 2,688,071 | 8/1954 | Wright | 354/126 X |
| 2,861,444 | 11/1958 | Bonanno | 354/126 X |
| 3,273,479 | 9/1966 | Jakob | 354/149.11 |
| 4,016,579 | 4/1977 | Lewis, Jr. | 354/126 |
| 4,016,580 | 4/1977 | Finelli | 354/126 |
| 4,166,683 | 9/1979 | Ito et al. | 354/219 X |
| 4,387,978 | 6/1983 | Pizzuti | 354/187 |
| 4,557,571 | 12/1985 | Reibl | 354/149.11 |
| 4,796,034 | 1/1989 | Leonard et al. | 354/145.1 |
| 4,819,016 | 4/1989 | Leonard et al. | 354/82 |

FOREIGN PATENT DOCUMENTS

| | | |
|---|---|---|
| 462350 | 11/1972 | Australia . |
| 49211/72 | 5/1974 | Australia . |
| 783660 | 9/1957 | United Kingdom . |
| 37-8031 | 2/1962 | Japan . |
| 38-271322 | 11/1963 | Japan . |

*Primary Examiner*—A. A. Mathews
*Attorney, Agent, or Firm*—Roger A. Fields

[57] ABSTRACT

A flip-up flash unit for a camera has a viewfinder opening for viewing a subject to be photographed when the flash unit is swung to an operative position elevated from the body of the camera. A finder objective lens and a finder eyelens are each swung to individual viewing positions optically aligned with the viewfinder opening, responsive to movement of the flash unit to its operative position. The body of the camera, therefore, can be made more compact because the need for a viewfinder opening and finder lenses built into the body is eliminated.

7 Claims, 3 Drawing Sheets

OPTICAL FINDER FOR CAMERA WITH FLIP-UP FLASH UNIT

CROSS-REFERENCE TO RELATED APPLICATION(S)

Reference is made to commonly assigned copending U.S. application Ser. No. 07/478,910 entitled CAMERA WITH FLIP-UP FLASH UNIT, and filed, Feb. 12, 1990 in the names of William L. Burnham et al.

BACKGROUND OF THE INVENTION

1. Field of the Invention

The invention relates generally to the field of photography and particularly to a viewfinder for a camera with a flip-up flash unit. More specifically, the invention relates to an optical finder and flash unit combination.

2. Description of the Prior Art

A current trend in camera design is to incorporate an electronic flash unit in the camera housing and yet make such housing relatively small in size in order to increase its ease of storage, portability and handling. Examples of smaller size cameras with built-in electronic flash units are the various disk film cameras, such as previously sold by Eastman Kodak Company and others. As a consequence of making a camera smaller in size, the separation between a built-in flash unit and the taking lens is reduced, thereby possibly creating an undesirable effect commonly known as "red-eye". When using a flash unit and a color print film, red-eye is typified by the pupils in the eyes of a person being photographed coming out red-tinted on a developed color print. Such phenonmenon is attributable to the incidence into the taking lens of the red light reflected from the retinas in the Person's eyes illuminated by the flash light.

Red-eye may be substantially avoided by increasing the separation between the flash unit and the taking lens. As a result, light from the flash unit will reach the eyes of a person being Photographed at too great an angle to be reflected by his retinas into the taking lens. In U.S. Pat. Nos. 4,231,645, granted Nov. 4, 1980, 4,319,818,granted Mar. 16, 1982, 4,557,571, granted Dec. 10, 1985, Des. No. 284,973 granted Aug. 5, 1986, Des. No. 285,087, granted Aug. 12, 1986, and 4,847,647, granted July 11, 1989, red-eye appears to be substantially avoided without increasing the size of a compact 35 mm camera to any great degree by providing a built-in electronic flash unit that is pivotable with respect to the camera housing. The flash unit is pivotable between an inactive folded position in which it forms an integrated part of the camera housing in front of the camera lens and/or the camera viewfinder, and an operative erect position in which it is sufficiently removed from the lens to permit picture-taking substantially without the occurrence of red-eye. In each of these designs, however, some compactness is sacrificed because of the need to include a viewfinder opening in the camera housing.

THE CROSS-REFERENCED APPLICATION

As compared to the prior art examples disclosed in the above cited patents, the cross-referenced application discloses a photographic camera which is relatively more compact. Specifically, there is disclosed a photographic camera comprising a camera housing and a flip-up flash unit. The flash unit includes a head part having a flash emission window and a supporting or neck-like part for the head part. The supporting part is pivotally connected to the camera housing to permit swinging movement of the flash unit to a folded storage position in which the head part and the supporting part cover respective portions of the camera housing and to a non-folded operative position in which the head part and the supporting part are elevated from the camera housing with the flash emission window substantially facing a subject to be photographed. According to the invention, the supporting part has a viewfinder opening for viewing a subject to be photographed when the flash unit is in the non-folded position. Thus, the camera housing can be made relatively compact because a viewfinder opening need not be built into the camera housing.

SUMMARY OF THE INVENTION

According to the invention, a photographic camera comprising (a) a camera housing and (b) a flip-up flash unit including a head part having a flash emission window and a supporting part for the head part connected to the camera housing to permit movement of the flash unit to a folded storage position in which the head part and the supporting Part cover respective portions of the camera housing and to a non-folded operative position in which the head part and the supporting part are elevated from the camera housing with the flash emission window substantially facing a subject to be photographed, is characterized in that:

the supporting part of the flash unit has a viewfinder opening for viewing a subject to be Photographed when the flash unit is in its non-folded position;

a finder objective lens and a finder eyelens are supported for movement relative to the camera housing to individual viewing positions in which the finder lenses are optically aligned with the viewfinder opening of the supporting part when the flash unit is in its non-folded position; and motion-transmitting means connects the supporting part and the finder lenses for moving the finder lenses to their viewing positions responsive to movement of the flash unit to its non-folded position.

Thus, as compared to the cross-referenced application, the invention provides an optical finder consisting of the finder objective lens and the finder eyelens, without sacrificing compactness of the camera housing.

DETAILED DESCRIPTION OF THE PREFERRED EMBODIMENT

The invention is described as being embodied in a compact 35 mm camera with a built-in electronic flash unit. Because such photographic cameras have become well known, this description is directed in particular to camera elements forming part of or cooperating directly with the preferred embodiment. It is to be understood, however, that camera elements not specifically shown or described may take various forms known to persons of ordinary skill in the art.

Figure 1:
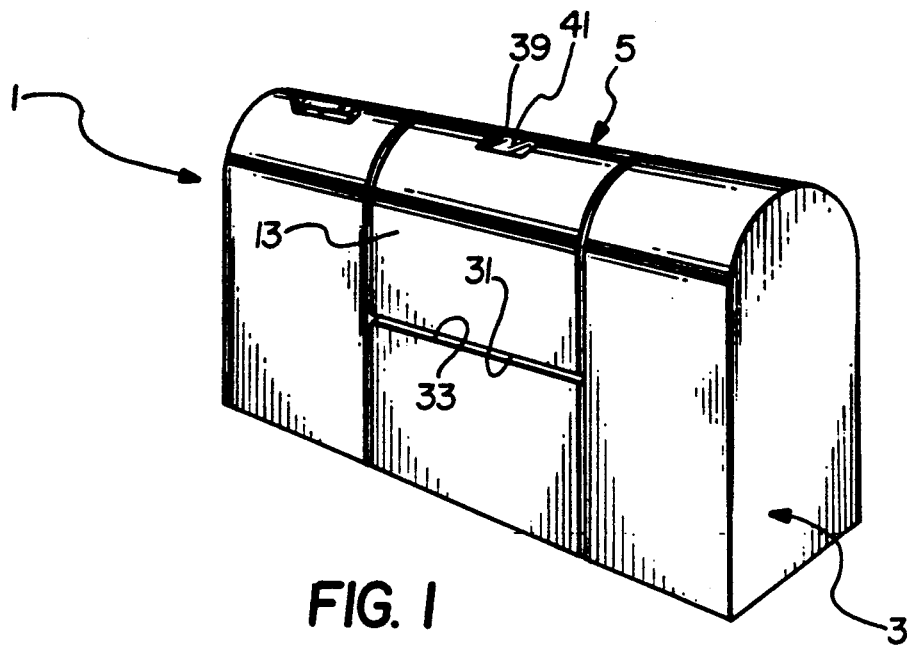
FIG. 1 is a front perspective view of a photographic camera with a flip-up flash unit according to a preferred embodiment of the invention, showing the flash unit in a folded storage position.
Figure 2:
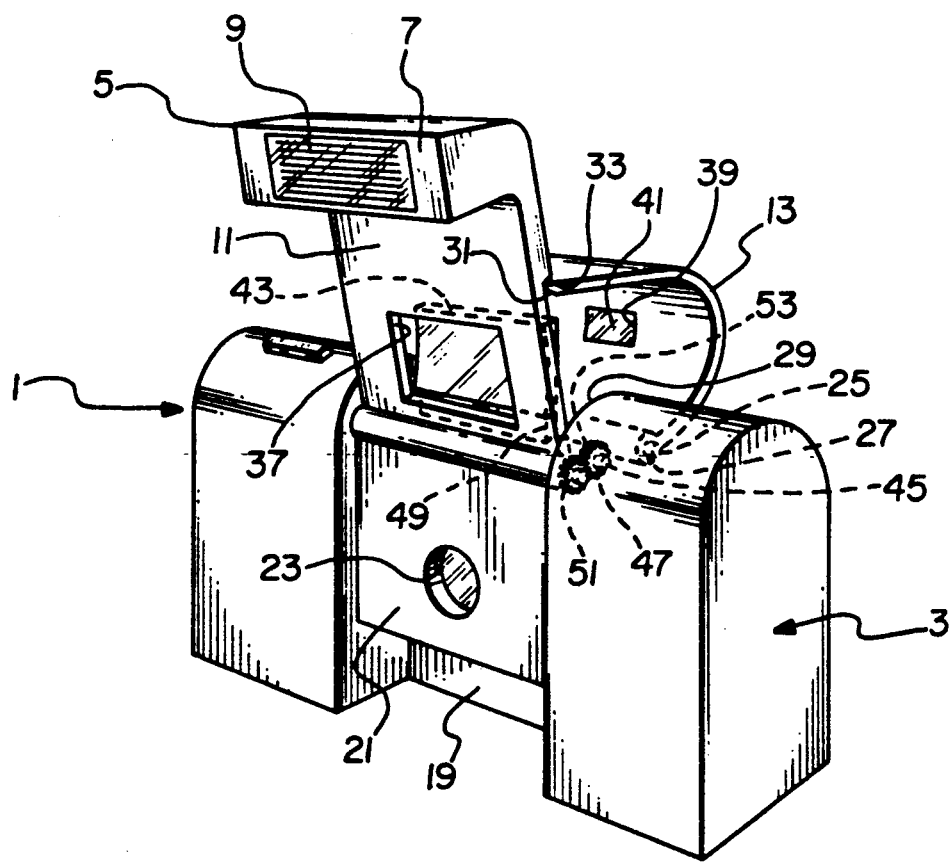
FIG. 2 is a view similar to FIG. 1, showing the flash unit in a non-folded operative position.

Referring now to the drawings, FIGS. 1 and 2 show a compact 35 mm camera 1 comprising a contoured housing 3 and a flip-up electronic flash unit 5. The flash unit 5 includes a head part 7 having a flash emission window 9 and a pair of front and rear supporting parts 11 and 13 for the head part. The front supporting part 11 is integrally formed with the head part 7, and is pivotally connected to the camera housing 3 by means of an axial pin 15 extending through an axial opening 17 in the front supporting part and having protruding opposite ends suspended by the camera housing. The pivotal connection of the front supporting part 11 to the camera housing 3 permits the flash unit 5 to be manually swung between a folded storage position, shown in FIGS. 1 and 3, in which the head part 7 fits within a lower recess 19 in the camera housing and the front supporting part fits within a front recess 21 in the camera housing to cover a lens opening 23, and a non-folded operative position, shown in FIGS. 2 and 5, in which the head part and the front supporting part are elevated from the camera housing with the flash emission window 9 substantially facing a subject to be photographed. The rear supporting part 13 is pivotally connected to the camera housing 3 by means of an axial pin 25 extending through an axial opening 27 in the rear supporting part and having protruding opposite ends suspended by the camera housing. The pivotal connection of the rear supporting part 13 to the camera housing 3 permits that part to be located within a top recess 29 in the camera housing when the flash unit 5 is in its folded position, shown in FIGS. 1 and 3, and to be elevated above the camera housing when the flash unit is in its non-folded position, shown in FIGS. 2 and 5. When the flash unit 5 is in its non-folded position, a forward edge 31 of the rear supporting part 13 engages or abuts the front supporting part 11 at a cross-wise edge 33 of the latter part to brace the flash unit in the non-folded position. A relatively light torsion spring 35 urges the rear supporting part 13 to continuously engage the front supporting part 11. See FIGS. 4 and 5.

According to the invention in its preferred embodiment, the front supporting part 11 has a rectangular front viewfinder opening 37 which is empty, and the rear supporting part 13 has a rectangular rear viewfinder opening 39 which contains a biconvex (positive) finder eyelens 41. The finder eyelens 41 is located behind the front viewfinder opening 37 in optical alignment with that opening when the flash unit 5 is in its non-folded position, to permit a subject to be photographed to viewed through the finder lens and the opening. See FIGS. 2 and 5. Similarly, a plano-concave (negative) finder objective lens 43 is pivotally connected to the camera housing 3 by means of an axial pin 45 which extends through an axial opening 47 in a supporting base or frame 49 for the finder objective lens and has protruding opposite ends suspended by the camera housing. The pivotal connection of the supporting base 49 to the camera housing 3 permits the finder objective lens 43 to be swung between a flat storage position shown in FIG. 3, in which the objective lens lies flat at the bottom of the lower recess 19 in the camera housing and an erect viewing position shown in FIGS. 2 and 5, in which the objective lens is located between the front viewfinder opening 37 and the finder eyelens 41 in optical alignment with the latter two elements when the flash unit 5 is in its non-folded position, to permit the subject to be photographed to be viewed through the finder objective lens as well as the finder eyelens and the viewfinder opening. The finder objective lens and the finder eyelens form an optical finder which uses the principle of an inverted or reverse Galilean telescope.

The front supporting part 11 and the supporting base 49 include respective integral gear rings 51 and 53 which continuously engage to swing the finder objective lens 43 from its flat storage position to its erect viewing position responsive to manual swinging of the flash unit 5 from its folded position to its non-folded position. See FIGS. 3-5. Conversely, the gear rings 51 and 53 operate to swing the finder objective lens 43 from its viewing position to its storage position responsive to manual swinging of the flash unit 5 from its non-folded position to its folded position.

The rear supporting part 13 is bowed to arch rearwardly of the camera housing 3 when the flash unit 5 is in its non-folded position, to locate the finder eyelens 41 sufficiently removed from the camera housing to permit a photographer to place one eye at that lens without any interference (obstruction) by the camera housing. See FIG. 5. Conversely, when the flash unit 5 is in its folded position, the rear supporting part 13 is urged by the torsion spring 35 to cover the front viewfinder opening 37 and the finder objective lens 43. See FIG. 3. Thus, in this instance, the rear supporting part 13 serves as a cover part.

Operation

Figure 3:
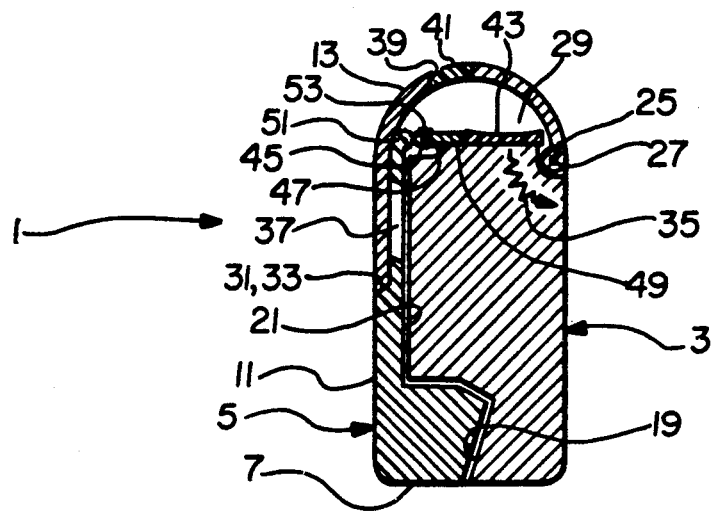
FIGS. 3, 4 and 5 are side elevation section views of the camera, showing progressive movement of the flash unit from its folded position, to an intermediate position and to its non-folded position.
Figure 4:
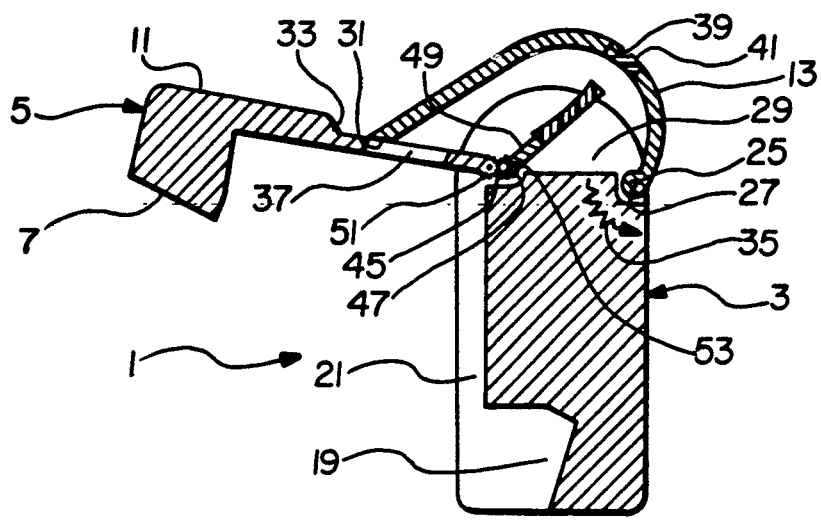
Figure 5:
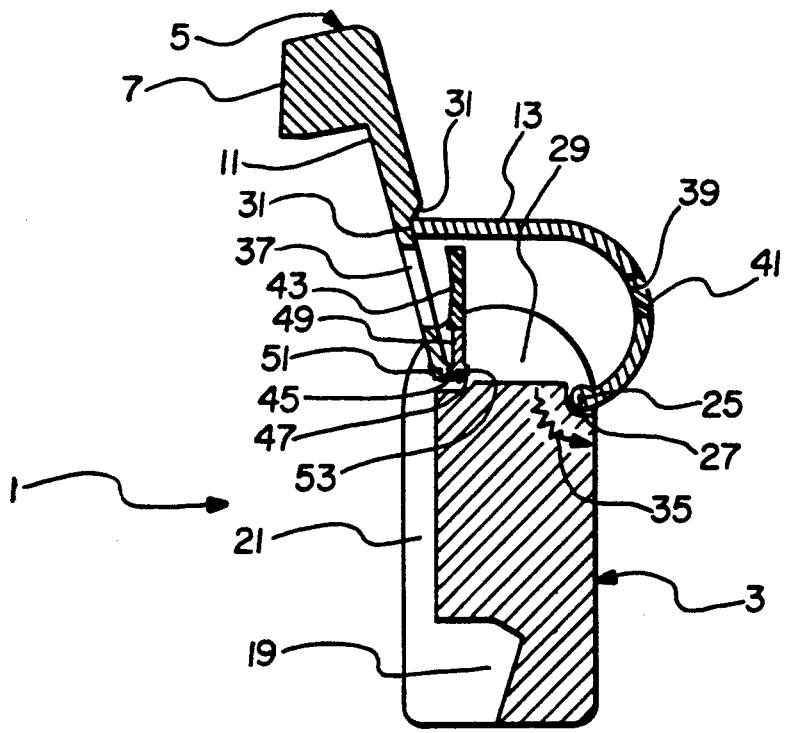

To use the 35 mm camera 1, the flash unit 5 must be manually swung from its folded position, shown in FIGS. 1 and 3, to its non-folded position, shown in FIGS. 2 and 5. As the flash unit 5 is swung to its non-folded position, the front supporting part 11 pushes against the rear supporting part 13 to swing the latter part out of the top recess 29. Similarly, the gear rings 51 and 53 operate to swing the finder objective lens 43 out of the top recess 29. See FIG. 4. Once the forward edge 31 of the rear supporting part 13 and the cross-wise edge 33 of the front supporting part 11 engage, the front part is braced in its non-folded position and the front viewfinder opening 37, the finder objective lens 43 and the finder eyelens 41 37 and 39 are optically aligned. See FIG. 5.

After picture-taking is completed, the flash unit 5 is manually swung from its non-folded position to its folded position. As the flash unit 5 is swung to its folded position, the torsion spring 39 pivots the rear supporting part 13 to maintain the latter part in continuous contact with the front supporting part 11. See FIG. 4. When the flash unit 5 is returned to its folded position, the rear supporting part 13 covers the front viewfinder opening 37 and the finder objective lens 43. See FIG. 3.

Alternate Embodiment

Figure 6:
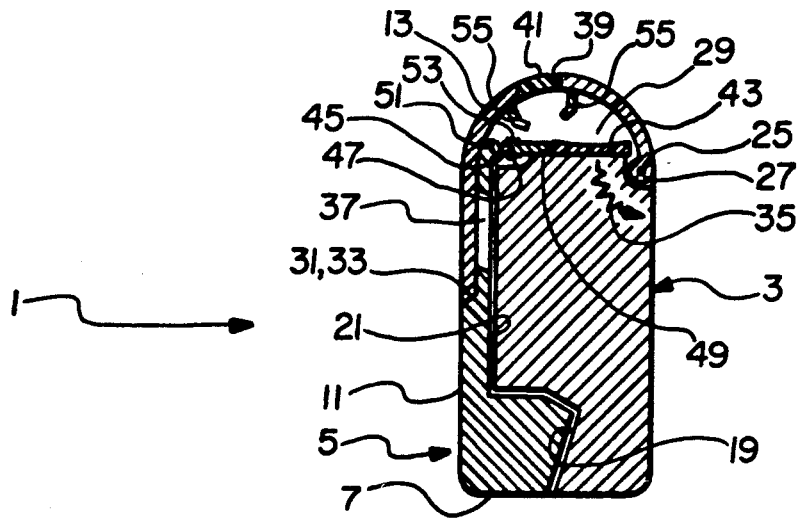
FIGS. 6, 7 and 8 are respective views similar to FIGS. 3–5, except they show an alternate embodiment of the flash unit.
Figure 7:
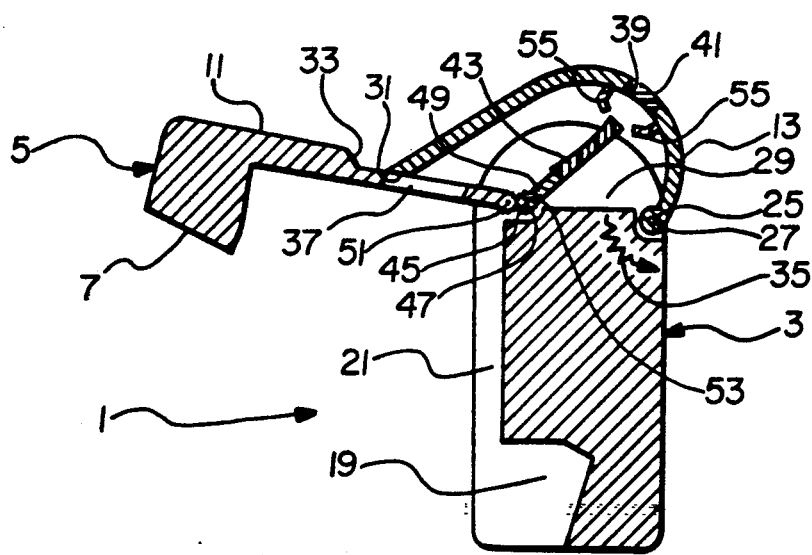
Figure 8:
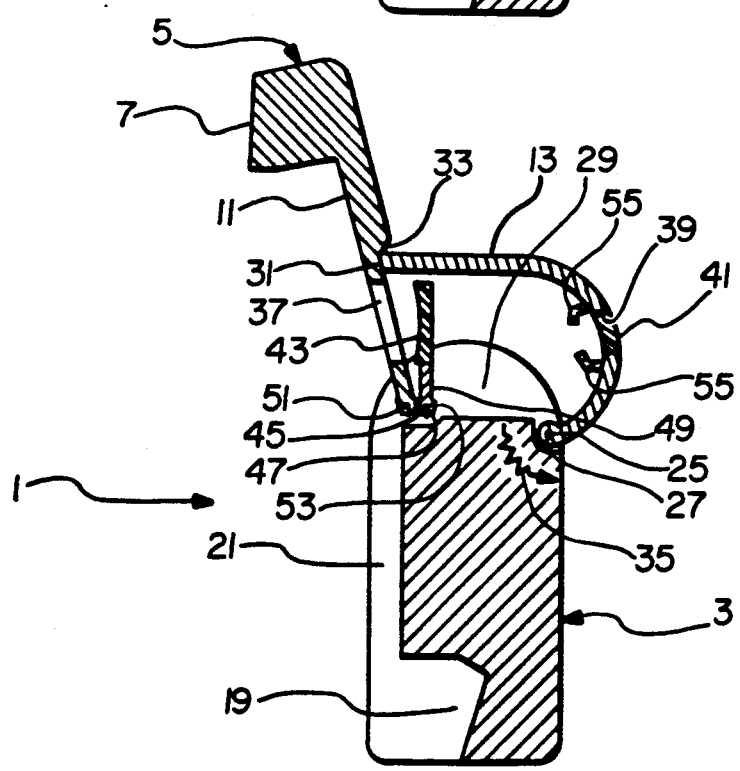

FIGS. 6-8 are respective views similar to FIGS. 3-5, except they show a light-baffle 55 projecting from the inside of the rear supporting part 13 to reduce glare from stray light at the finder eyelens 41.

While the invention has been described with reference to a preferred embodiment, it will be understood that various modifications can be effected within the ordinary skill in the art without departing from the scope of the invention. For example, a 35 mm camera may be devised as in cited U.S. Pats. Nos. 4,557,571; 4,350,420 and 4,319,818, in which the flip-up flash consists of a head part and only one supporting part. This in in contrast to cited U.S. Pats. Des. Nos. 285,087 and 284,973 in which the flip-up flash includes front and rear supporting parts.

According to another example, the flash unit might be a type that pops-up rather than pivots up.

I claim:

1. A photographic camera comprising (a) a camera housing and (b) a flip-up unit including a head part having a flash emission window and a supporting part for said head part connected to said camera housing to permit movement of said flash unit to a folded storage position in which the head part and said supporting part cover respective portions of the camera housing and to a non-folded operative position in which the head part and the supporting part are elevated from the camera housing with said flash emission window substantially facing a subject to be photographed, is characterized in that:

said supporting part of said flash unit has a viewfinder opening for viewing through said viewfinder opening a subject to be photographed when the flash unit is in its non-folded position;

a finder objective lens and a finder eyelens are supported for movement relative to said camera housing to individual viewing positions in which said finder lenses are optically aligned with and spaced behind said viewfiner opening of said supporting part when said flash unit is in its non-folded position, to permit a subject to be photographed to be viewed through the finder lenses in addition to through the viewfinder opening; and motion-transmitting means connects said supporting part and said finder lenses for moving the finder lenses to their viewing positions responsive to movement of said flash unit to its non-folded position.

2. A photographic camera as recited in claim 1, wherein said flash unit includes a cover part supported for movement relative to said camera housing to cover said viewfinder opening of said supporting part and said finder objective lens as the flash unit is moved to its folded position and to uncover the viewfinder opening and the finder objective lens as the flash unit is moved to its non-folded position, said cover part including said finder eyelens.

3. A photographic camera as recited in claim 2, wherein said cover part includes light-baffle means located adjacent said finder eyelens for reducing glare at the finder eyelens.

4. A photographic camera as recited in claim 2, wherein said finder objective lens is located substantially flat beneath said cover part when said flash unit is in its folded position and is located between said viewfinder opening of said supporting part and said finder eyelens when the flash unit is in its non-folded position.

5. A photographic camera as recited in claim 1, wherein said finder objective lens is a negative lens and said finder eyelens is a positive lens.

6. A photographic camera as recited in claim 1, wherein said finder objective lens is normally arranged to lie substantially flat atop said camera housing and is located between said viewfinder opening of said supporting part and said finder eyelens when said flash unit is in its non-folded position.

7. A photographic camera comprising (a) a camera housing and (b) a flip-up flash unit including a head part having a flash emission window and a supporting part for said head part connected to said camera housing to permit movement of said flash unit to a folded storage position in which the head part and said supporting part cover respective portions of the camera housing and to a non-folded operative position in which the head part and the supporting part are elevated from the camera housing with said flash emission window substantially facing a subject to be photographed, is characterized in that:

said supporting part of said flash unit has a viewfinder opening for viewing a subject to be photographed when the flash unit is in its non-folded position;

a finder objective lens and a finder eyelens are supported for movement relative to said camera housing to individual viewing positions in which said finder lenses are optically aligned with said viewfinder opening of said supporting part when said flash unit is in its non-folded position;

said finder objective lens is normally arranged to lie substantially flat atop said camera housing and is located between said viewfinder opening of said supporting part and said finder eyelens when said flash unit is in its non-folded position; and motion-transmitting means connects said supporting part and said finder lenses for moving the finder lenses to their viewing positions responsive to movement of said flash unit to its non-folded position.

* * * * *